US012480799B2

(12) United States Patent
Gais

(10) Patent No.: US 12,480,799 B2
(45) Date of Patent: Nov. 25, 2025

(54) FILL LEVEL MEASURING DEVICE

(71) Applicant: Endress+Hauser SE+Co. KG, Maulburg (DE)

(72) Inventor: Jürgen Gais, Weil am Rhein (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 1321 days.

(21) Appl. No.: 17/268,583

(22) PCT Filed: Aug. 13, 2019

(86) PCT No.: PCT/EP2019/071654
§ 371 (c)(1),
(2) Date: Feb. 15, 2021

(87) PCT Pub. No.: WO2020/035472
PCT Pub. Date: Feb. 20, 2020

(65) Prior Publication Data
US 2021/0172786 A1    Jun. 10, 2021

(30) Foreign Application Priority Data
Aug. 16, 2018  (DE) .................... 10 2018 119 976.7

(51) Int. Cl.
*G01F 23/284* (2006.01)
*G01F 23/80* (2022.01)

(52) U.S. Cl.
CPC .......... *G01F 23/284* (2013.01); *G01F 23/804* (2022.01)

(58) Field of Classification Search
CPC .... G01F 23/284; G01F 23/804; G01S 7/4021; G01S 7/411; G01S 7/414; G01S 13/08; G01S 13/88
See application file for complete search history.

(56) References Cited

U.S. PATENT DOCUMENTS

| | | |
|---|---|---|
| 2007/0194799 A1 | 8/2007 | Carobbio |
| 2009/0146867 A1 | 6/2009 | Delin et al. |
| 2014/0052389 A1* | 2/2014 | Welle .................... G01S 7/2923 367/87 |
| 2015/0192449 A1* | 7/2015 | Malinovskiy, I ..... G01F 23/296 342/124 |

FOREIGN PATENT DOCUMENTS

| | | |
|---|---|---|
| DE | 4233324 A1 | 4/1994 |
| DE | 102012104858 A1 | 12/2013 |
| DE | 102012107146 A1 | 2/2014 |
| DE | 102013108490 A1 | 2/2015 |

* cited by examiner

*Primary Examiner* — Robert W Hodge
*Assistant Examiner* — Bongani Jabulani Mashele
(74) *Attorney, Agent, or Firm* — Christopher R. Powers; Endress+Hauser (USA) Holding, Inc.

(57) ABSTRACT

A fill level measuring device for radar-based measuring of fill level of a substance within a container includes: a measuring unit for determining the dielectric constant of the substance; and an evaluating unit configured to determine the fill level based on the extent to which a maximum of a measurement curve exceeds a predefined reference curve and to set an offset and/or a function type of the reference curve as a function of the measured dielectric constant such that the fill level measuring device adapts the position of the reference curve automatically based on the substance or the reflection conditions in the container such that manual matching to the reflection conditions in the container by a maintenance technician is then unnecessary.

7 Claims, 2 Drawing Sheets

FILL LEVEL MEASURING DEVICE

CROSS-REFERENCE TO RELATED APPLICATIONS

The present application is related to and claims the priority benefit of German Patent Application No. 10 2018 119 976.7, filed on Aug. 16, 2018, and International Patent Application No. PCT/EP2019/071654, filed on Aug. 13, 2019, the entire contents of which are incorporated herein by reference.

TECHNICAL FIELD

The invention relates to a fill level measuring device for measuring a fill substance located in a container as well as to a method for operation of the fill level measuring device.

BACKGROUND

In process automation technology, field devices are applied, which serve for registering or for influencing process variables. For registering process variables, sensors are applied, which serve, for example, in fill level measuring devices, flow measuring devices, pressure and temperature measuring devices, pH-redox potential measuring devices, conductivity measuring devices, or comparable measuring devices. They register the corresponding process variables, such as fill level, flow, pressure, temperature, pH value, redox potential or conductivity. A wide variety of such field device types are produced and sold by the firm, Endress+Hauser.

For fill level measurement of fill substances in containers, radar-based measuring method have become widely accepted, since they are robust and low maintenance. In such case, the term "container" in the context of the invention includes also non-closed containments, such as, for example, vats, lakes and flowing bodies of water. A central advantage of radar-based measuring methods is their ability to measure the fill level virtually continuously. In the context of the invention, the term "radar" refers to signals, or electromagnetic waves, with frequencies between 0.03 GHz and 300 GHz.

In the case of radar-based fill level measurement, the pulse travel time method is one established measuring principle. In such case, microwave pulses are cyclically transmitted toward the fill substance as measurement signals and the travel time measured to the receipt of the corresponding echo pulse. Based on this measuring principle, fill level measuring devices can be implemented with comparatively little circuit complexity. A radar-based fill level measuring device, which works according to the pulse travel time method, is described, for example, in publication DE 10 2012 104 858 A1.

To the extent that a more complex circuit technology can be tolerated, FMCW ("Frequency Modulated Continuous Wave") is another measuring principle, which can be applied for radar-based fill level measurement. Regarding a typical construction of FMCW based fill level measuring devices, reference is made, by way of example, to publication DE 10 2013 108 490 A1.

The measuring principle of FMCW radar-based distance measuring methods rests on transmitting a radar-based measurement signal, indeed, continuously, but with modulated frequency. In such case, the frequency of the measurement signal lies in a fixed frequency band around a standardized center frequency. Characteristic for FMCW, in such case, is that the transmitting-frequency is not constant, but, instead, changes periodically within the fixed frequency band. Frequency as a function of time is, in such case, according to standard, linear and has a sawtooth or triangular shape. A sine-shaped change can, in principle, however, also be used. In contrast to the pulse travel time method, distance, or fill level, in the case of the FMCW method is determined based on the instantaneous frequency difference between the currently received, reflected echo signal and the instantaneously transmitted measurement signal.

Besides freely radiating radar measurement, wherein the measurement signal is radiated and received via an antenna, there is additionally the method of guided radar. In such case, the measurement signal is guided via an electrically conductive probe (for example, a coaxial cable or a metal rod), which extends down into the container. At the surface of the fill substance, the echo signal is produced in the probe and reflected back along the probe to the fill level measuring device. This variant of radar-based fill level measurement is also known under the term, "TDR" ("Time Domain Reflectometry"). Advantageous in the case of this variant is that, because of the guided signal emission, less power is required for operating the fill level measuring device.

In the case of each of the above-mentioned measuring principles (pulse travel time and FMCW; whether with guided or free radiation), a corresponding measurement curve is plotted for ascertaining the fill level based on the received, reflected echo signal. In the case of the pulse radar-based method, the measurement curve is created by undersampling the reflected echo signal, because of the high pulse frequency. In this way, the measurement curve is a time-expanded version of the actual, reflected echo signal. In the case of implementing the FMCW method, the measurement curve is created by mixing the instantaneously transmitted measurement signal with the reflected echo signal. Independently of the measuring principle, the measurement curve reflects the amplitude of the reflected echo signal as a function of measured distance.

Fill level is determined from the measurement curve by detection and locational placement of the appropriate locational maximum. In order to be able to detect this maximum without there being any doubt as to the correctness of the identification, it is already known, in given cases, to smooth the measurement curve by means of a suitable filtering method, such as average value, maximum value or low-pass filtering, in order then to be able to determine the fill level based on the smoothed measurement curve. In such case, a small smoothing offers the advantage that the maxima can be locationally better resolved. In this way, the fill level can be more exactly determined. This is limited by a greater smoothing. However, with a greater smoothing, the error, or disturbance, susceptibility of the fill level measurement is reduced.

A filtering of the measurement curve does not, however, enable the detecting, or masking, of static disturbance echos. In the case of freely radiating radar, disturbance echos can be brought about, for example, by objects installed in the container interior. In the case of guided radar, disturbance echos can be brought about, above all, by fill substance deposits on the probe. Due to this, there is provided in the fill level measuring device for the measurement curve a reference curve (also known under the term, "echo threshold"). If the amplitude of a maximum in the measurement curve does not exceed the associated value in the reference curve, then this maximum is categorically not taken into consideration for determining fill level.

Depending on variant, in which the fill level measurement is executed, the reference curve can be differently defined. In the simplest case, it is defined as a constant function over the fill level range. Since the amplitude of the echo signal in practice, however, decreases with sinking fill level, the reference curve is often especially defined as a decreasing function in the case of guided radar, for example, as a decreasing e-function or as a decreasing fractional, rational function. In the case of freely radiating radar, the reference curve can also be based on a reference measurement in the case of an empty container. In general, the amplitude of the received echo signal depends also on the type, or the dielectric constant, of the fill substance in the container. Therefore, to the extent that the dielectric constant of the fill substance is not taken into consideration, or changes, the position, or the offset, of the reference curve relative to amplitude can be wrongly set. As a result, either an incorrect or no fill level value at all is ascertained by the fill level measuring device. In the case of hazardous fill substances, this can lead to safety-critical conditions in the container.

SUMMARY

An object of the invention, therefore, is to provide a safe fill level measuring device. The invention achieves this object by a fill level measuring device for radar-based measuring of fill level of a fill substance located in a container, comprising:
  a measuring unit, which is embodied to determine the dielectric constant of the fill substance;
  a signal production unit, which is embodied to couple a radar-based measurement signal into an antenna or a probe, wherein the antenna or the probe is so orientable that the measurement signal is transmitted toward the fill substance; and
  an evaluating unit, which is embodied:
    after reflection of the transmitted signal on the surface of the fill substance, on the probe end or on the container floor, to receive an echo signal via the antenna, or the probe, based on at least the echo signal;
    to create a measurement curve, based on a maximum of the measurement curve, to determine the fill level, to the extent that the maximum exceeds a corresponding value of the reference curve; and
    to set an offset and/or a function type of the reference curve as a function of the measured dielectric constant.

In such case, the term "function type" in the context of the invention refers to the type of data set on which the reference curve is based. Thus, the data set can involve, for example, value pairs of a mathematical function, such as a decaying e-function or a fractional, rational function. It can, however, also involve the value pairs of a reference measurement of the radar-based fill level measurement, e.g., in an empty container or when the fill level has fallen below a minimum level.

In the fill level measuring device of the invention, the position of the reference curve (also known as echo threshold) is automatically matched to the dielectric constant of the fill substance and thus to the reflection conditions in the container. In this way, the reliability of the fill level measuring device is significantly increased. Thus, a possible manual matching of the reference curve to the reflection conditions in the container is absent. Advantageously, this works especially when the container is filled with different fill substances at different points in time with, in each case, dielectric constants not known in greater detail.

In the context of the invention, the term "unit" refers to an electronic circuit, which is embodied suitably according to the application. It can, thus, depending on requirements, be an analog circuit for producing, and/or processing, corresponding analog signals. It can, however, also be a program interacting with a (semiconductor based) digital circuit such as a computer block or a memory. In such case, the program is embodied to perform the appropriate method steps, or to apply the needed computer operations of the unit. In this context, different electronic units of the fill level measuring device in the sense of the invention can potentially also use a shared memory or be operated by means of the same computer circuit.

Since the intensity of the reflected transmitted signal increases with rising dielectric constant, it is advantageous that the evaluating unit of the fill level measuring device of the invention be embodied to increase the offset with increasing dielectric constant. This can, in the simplest case, occur linearly. Any other relationship, such as an exponential or logarithmic increase is, however, likewise within the scope of the invention.

In a possible embodiment of the fill level measuring device, the measuring unit can be embodied to measure the dielectric constant, in that the measuring unit:
  detects an extreme value of the measurement curve corresponding, for instance, to a predefined minimum fill level,
  determines a shifting of the extreme value, to the extent that a fill level change is detected, and
  determines the dielectric constant based on the shifting of the extreme value and based on the fill level change.

Thus, in this embodiment, the effect of an imaginary shifting of the probe-end echo, or the container floor echo in the measurement curve is utilized in the case of a change of the dielectric constant of the fill substance. Advantageous in this case is, for example, that the fill level measuring device, or the measuring unit, needs no separate sensor for measuring the dielectric constant.

In the context of the invention, it is not fixedly prescribed which course the reference curve must have as a function of fill level. Advantageously, the reference curve is implemented in the evaluating unit as a function, or curve, decreasing with decreasing fill level, since the intensity of the reflected transmitted signal decreases with increasing distance to the fill level measuring device. In such case, the distance-dependent decrease can be implemented, for example, by means of a reference curve in the form of a decaying e-function or decaying fractional, rational function. In this case, the reference curve is especially implemented in the evaluating unit as a fractional, rational function type or as an exponential function type. Alternatively, it is for the purpose of a simple implementation, however, also possible to provide the reference curve in the evaluating unit as a constant function independent of the fill level.

Corresponding to the fill level measuring device of the invention, the object of the invention is also achieved by a method for radar-based measuring of fill level of a medium located in a container by means of a fill level measuring device according to one of the above embodiments. Accordingly, the method includes method steps as follows:
  measuring a dielectric constant of the fill substance;
  transmitting a radar-based measurement signal toward the fill substance;

receiving an echo signal after reflection of the signal transmitted to the surface of the fill substance to the probe end or to the container floor;

creating a measurement curve based at least on the echo signal; and determining the fill level based on a maximum of the measurement curve and based on a corresponding point of a reference curve, to the extent that the maximum exceeds the reference curve.

In such case, an offset and/or function type of the reference curve is set as a function of the measured dielectric constant.

BRIEF DESCRIPTION OF THE DRAWINGS

The invention is explained in greater detail with reference to the following figures, which show.

DETAILED DESCRIPTION

Figure 1:
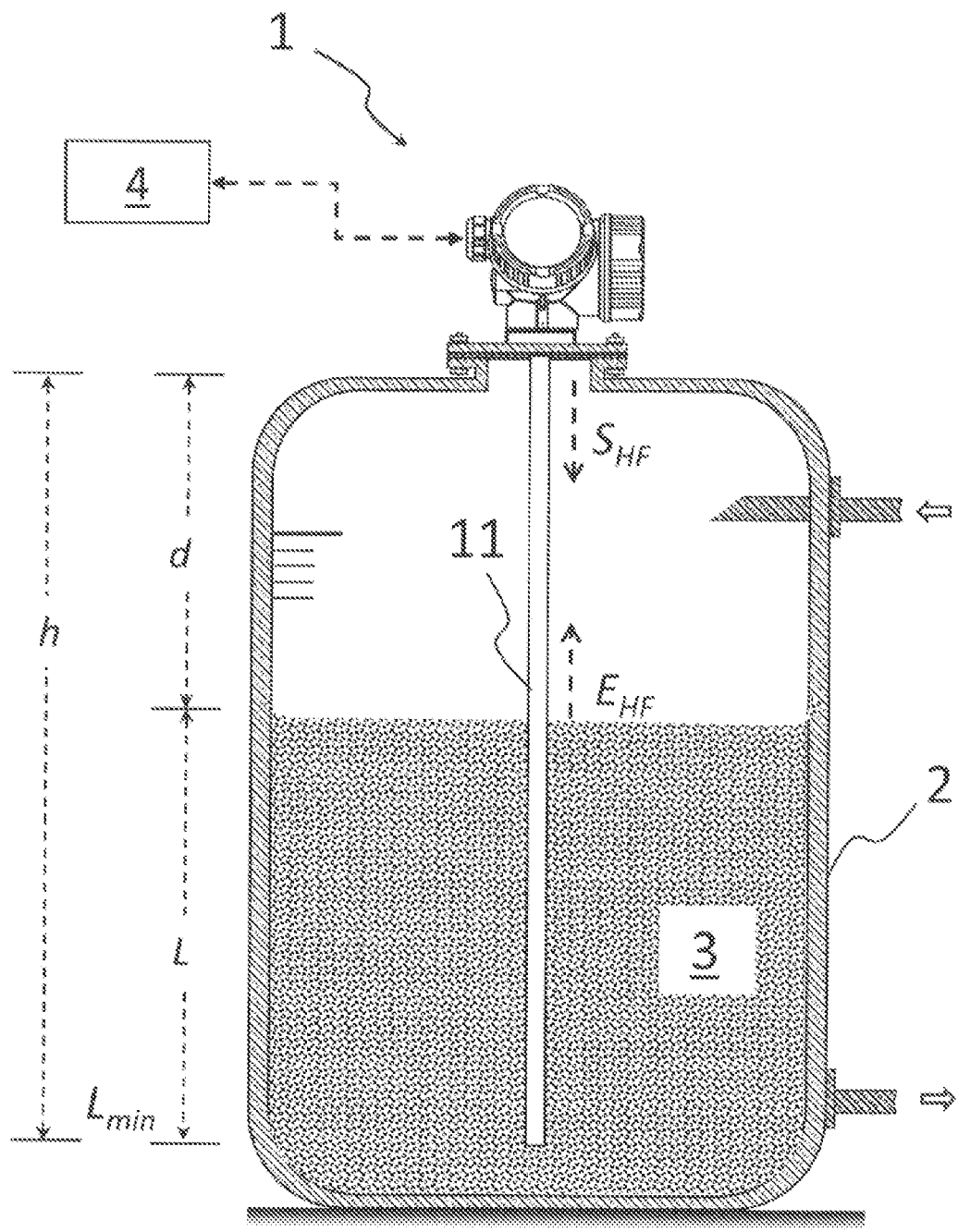
FIG. 1 shows an arrangement of a guided radar fill level measuring device.

For fundamental understanding of the invention, FIG. 1 shows a typical arrangement of a guided, radar-based, fill level measuring device 1 mounted on a container 2. Located in the container 2 is a fill substance 3, whose fill level L is to be determined by the fill level measuring device 1. In this regard, the fill level measuring device 1 is located on the container 2 above the maximum allowable fill level L.

Generally, the fill level measuring device 1 is connected via a bus system, for instance, an "Ethernet", "PROFIBUS", "HART" or "wireless HART" bus system, with a superordinated unit 4, for example, a process control system or a decentralized database. In this way, on the one hand, information concerning the operating state of the fill level measuring device 1 can be communicated. However, also information concerning the fill level L can, be transmitted via the bus system, in order, in given cases, to control flow to the container 2.

The fill level measuring device 1 shown in FIG. 1 is embodied as a guided radar fill level measuring device. Therefore, the fill level measuring device 1 includes an electrically conductive probe 11. In such case, the probe 11 can be embodied, for example, as a metal rod, metal cable or metal hollow conductor. Probe 11 is so oriented that it extends from the fill level measuring device 1 perpendicularly down into the container 2. The measuring range, or the minimum detectable fill level $L_{min}$, is defined accordingly by the length h of the probe 11 (in the case of a freely radiating fill level measuring device 1, an antenna oriented toward the fill substance 3 would be used instead of the probe 11; in such case, the minimum detectable fill level $L_{min}$ would correspond to the container floor).

Via the probe 11, the fill level measuring device 1 transmits a radar-based measurement signal $S_{HF}$ toward the fill substance 3. For this, the fill level measuring device 1 includes a corresponding signal production unit, which is embodied to couple the radar-based measurement signal $S_{HF}$ into the probe 11 in accordance with the implemented measuring principle (FMCW or pulse travel time method). In the case of FMCW, the signal production unit can be based on a PLL ("phase locked loop") for producing the measurement signal $S_{HF}$, wherein the, for instance, sawtooth-shaped, frequency change can be set by a corresponding operation of the PLL. In the case of the pulse travel time method, the signal production unit for producing the measurement signal $S_{HF}$ can be based, for example, on a voltage controlled oscillator (also known as a "VCO"), which is operated corresponding to the desired pulse length, or the desired pulse/pause ratio.

By reflection of the measurement signal $S_{HF}$ at the height of the fill substance surface, a corresponding echo signal $E_{HF}$ is produced and led back in the probe 11. An evaluating unit of the fill level measuring device 1 receives the echo signal $E_{HF}$ via the probe 11 after a corresponding travel time. In such case, the travel time depends on the distance d=h−L of the fill level measuring device 1 from the fill substance surface. For ascertaining the travel time, and the distance d, the evaluating unit creates a measurement curve $E'_{HF}$, which is based on the echo signal $E_{HF}$. In such case, the creation depends, in turn, on the particular measuring principle: In the case of implementing the FMCW principle, the received echo signal $E_{HF}$ is, for example, mixed by means of a mixer of the evaluating unit with the instantaneously transmitted measurement signal $S_{HF}$. From the difference frequency of the resulting mixed signal, the distance d, and the fill level L, can be ascertained. A correspondingly designed evaluation block of the evaluating unit can, in such case, convert the mixed signal, for example, by means of an FFT ("Fast Fourier Transform"), into the frequency dependent measurement curve $E'_{HF}$. In such case, a maximum $M_L$ of the measurement curve $E'_{HF}$ reflects in the ideal case the frequency of the resulting mixed signal and, as a result, the distance d to the fill substance.

In the case of implementing the pulse travel time method, the measurement curve $E'_{HF}$ is created by undersampling the echo signal $E_{HF}$. Current practice is that a sampling block of the evaluating unit supplies the pulse-shaped echo signal $E_{HF}$ with an, in turn, pulse-shaped sampling signal (which is produced, for example, by means of a second VCO), wherein the pulse rate of the sampling signal deviates slightly from the pulse rate of the measurement signal $S_{HF}$, or of the echo signal $E_{HF}$. The sampling leads to a measurement curve $E'_{HF}$ in the form of a time-expanded echo signal $E_{HF}$. In this case, under ideal conditions, a global maximum $M_L$ of the measurement curve $E'_{HF}$ can be directly associated with the signal travel time and therewith the distance d, and the fill level.

Figure 2:
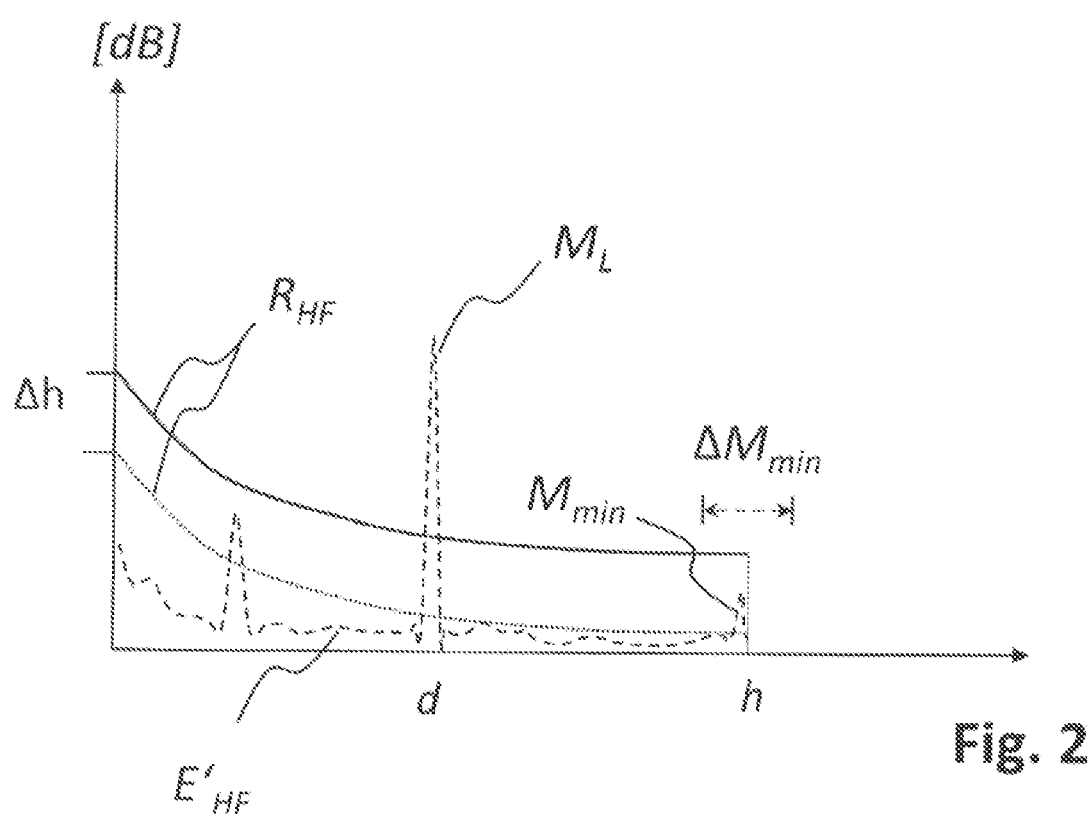
FIG. 2 shows a measurement curve including a reference curve.

A schematic measurement curve $E'_{HF}$, which indicates the real situation in the case of the container 2 illustrated in FIG. 1, is shown in FIG. 2. In such case, the measurement curve $E'_{HF}$ can have been created both by means of the FMCW method, as well as well as also by means of the pulse travel time method. In the illustrated measurement curve $E'_{HF}$, it is shown that not only the fill substance surface produces a corresponding maximum $M_L$ in the measurement curve $C_m$. Besides the maximum $M_L$, which is brought about by the fill substance surface, a further extreme value $M_{min}$ can be seen, which is brought about by the end of the probe 11. Since the probe end is not grounded, it appears as a maximum (In the case of grounding of the probe end, the extreme value would appear as a minimum). In the case of freely radiated measurement signal $S_{HF}$, a corresponding extreme could be brought about by the floor of the container 2.

Also, deposits on the probe 11 can, as shown in FIG. 2, lead to other maxima (in the case of free radiation, this could also be brought about by objects installed in the interior of the container 2, such as, for example, supply lines). Moreover, also multiple reflections within the probe 11, or, in the case of free radiation, within the container 2, can lead to additional maxima in the measurement curve $E'_{HF}$.

In order, in spite of possible disturbance echos, to be able correctly to determine that maximum $M_L$, which is associated with the fill substance surface, a reference curve $R_{HF}$ is provided in the evaluating unit of the fill level measuring device 1. As shown in FIG. 2, the reference curve $R_{HF}$ is defined starting from the fill level measuring device 1 at least to the probe end, thus to the minimum detectable fill level $L_{min}$. The evaluating unit utilizes the reference curve $R_{HF}$ for reconciliation of the measurement curve $E'_{HF}$. The evaluating unit takes into consideration as potential echos for fill level determination only those measurement curve $E'_{HF}$ maxima $M_L$, which exceed the corresponding value of the reference curve $R_{HF}$.

As can be seen in FIG. 2, it can happen mistakenly, depending on position, or offset $\Delta h$, of the reference curve $R_{HF}$, that in the case of too small setting of the offset $\Delta h$, a disturbance echo is taken into consideration for fill level determination. In such case, the term "offset $\Delta h$" refers in the context of the invention to the shifting of the reference curve $R_{HF}$ along that axis, which establishes the signal strength, or amplitude in the measurement curve $E'_{HF}$.

In the case of too high setting of the offset $\Delta h$, possibly the maximum $M_L$ of the fill substance surface could be covered, so that no fill level value L is determinable. In the case of too low setting of the offset $\Delta h$, the fill level L could be incorrectly calculated based on a disturbance echo $M_{min}$. According to the invention, the fill level measuring device 1 establishes the offset $\Delta h$, or also the function type of the reference curve $R_{HF}$, independently as a function of the measured dielectric constant DK. Thus, the fill level measuring device 1 sets the reference curve $R_{HF}$ automatically based on the fill substance 3, or on the reflection conditions, in the container 2. In this way, the reliability of the fill level measurement is significantly increased. A manual matching to the reflection conditions in the container 2 by a maintenance technician becomes thereby unnecessary.

Since the size of the reflected echo signal $E_{HF}$ relative to the transmitted measurement signal $S_{HF}$ increases proportionally with the dielectric constant DK, the evaluating unit of the fill level measuring device 1 is so embodied that the offset $\Delta h$ increases linearly with increasing dielectric constant DK. The reference curve $R_{HF}$ illustrated in FIG. 2 decreases with decreasing fill level L, since also the intensity of the reflected echo signal $E'_{HF}$ decreases with increasing distance d. In such case, the decline of the reference curve $R_{HF}$ can be implemented, for example, exponentially or also as a fractional, rational function.

The fill level measuring device 1 shown in FIG. 1 can determine the dielectric constant DK, for example, in that the measuring unit in the case of a known fill level L, firstly, detects that extreme value $M_{min}$ of the measurement curve $E'_{HF}$ corresponding to the probe end, and notes it as such. As soon as the fill level L changes, the extreme value $M_{min}$ shifts in the measurement curve $E'_{HF}$. The reason for this is that the path length L of the measurement signal $S_{HF}$ through the fill substance 3 changes, whereby because of the DK value of the fill substance 3, in turn, the signal travel time to the probe end changes. Thus, the fill level measuring device 1 can determine the imaginary shifting of the extreme value $\Delta M_{min}$ and the change of the fill level L, to the extent that a fill level change $\Delta L$ happens. Accordingly, the evaluating unit can, based on the shifting of the extreme value $\Delta M_{min}$ and based on the fill level change $\Delta L$, determine the dielectric constant DK based on the physical relationship:

$$DK \sim \left( c^{-1} - \frac{\Delta M_{min}}{\Delta L} \right)^2$$

(c, in such case, is the speed of light in vacuum). In the case of a freely radiating radar-based fill level measuring device 1, for determining the dielectric constant DK correspondingly to the probe end, the extreme of the container floor in the measurement curve $E'_{HF}$ could be taken into consideration. Advantageous in the case of such method for determining the dielectric constant DK of the fill substance 3 is that the fill level measuring device 1 requires no extra measuring unit for determining the dielectric constant DK. Of course, the fill level measuring device 1 of the invention can alternatively also be embodied to use an extra measuring unit for dielectric constant measurement, for example, by means of a sensor located on the container floor.

The invention claimed is:

1. A fill level measuring device configured for radar-based measuring of fill level of a fill substance within a container, the measuring device comprising:
   a measuring unit adapted to determine the dielectric constant of the fill substance;
   a signal production unit configured to couple a radar-based measurement signal into an antenna or a probe of the measuring device, wherein the antenna or the probe is orientable such that the measurement signal is transmitted toward the fill substance within the container; and
   an evaluating unit configured:
      to receive an echo signal via the antenna, or the probe, wherein the echo signal comprises a reflection of the transmitted signal;
      based on at least the echo signal, to generate a measurement curve;
      based on a maximum of the measurement curve, to determine the fill level to the extent that the maximum exceeds a predefined reference curve; and
      to set an offset and/or a function type of the reference curve as a function of the measured dielectric constant,
   wherein, as to measure the dielectric constant, the measuring unit is adapted to:
      detect an extreme value of the measurement curve that corresponds to a predefined minimum fill level;
      determine a shifting of the extreme value, to the extent that a fill level change is detected; and
      determine the dielectric constant based on the shifting of the extreme value and on the fill level change.

2. The fill level measuring device of claim 1, wherein the evaluating unit is further configured to increase the offset with increasing dielectric constant.

3. The fill level measuring device of claim 2, wherein the evaluating unit is configured to increase the offset linearly with increasing dielectric constant.

4. The fill level measuring device of claim 1, wherein the reference curve is implemented in the evaluating unit as a function decreasing with decreasing fill level.

5. The fill level measuring device of claim 1, wherein the reference curve is implemented in the evaluating unit as a fractional, rational function type or as an exponential function type.

6. The fill level measuring device of claim 1, wherein the reference curve is implemented in the evaluating unit as a constant function independent of the fill level.

7. A method for radar-based measuring of fill level of a medium within a container, the method comprising:
   providing a fill level measuring device configured for radar-based measuring of fill level of the medium within the container, the measuring device comprising:
      a measuring unit adapted to determine a dielectric constant of the medium;
      a signal production unit configured to couple a radar-based measurement signal into an antenna or a probe of the measuring device, wherein the antenna or the probe is orientable such that the measurement signal is transmitted toward the medium within the container; and
      an evaluating unit configured to receive an echo signal via the antenna or the probe and to generate a measurement curve;
   measuring the dielectric constant of the medium using the measuring unit by:
      detecting an extreme value of the measurement curve that corresponds to a predefined minimum fill level;
      determining a shifting of the extreme value, to the extent that a fill level change is detected; and
      determining the dielectric constant based on the shifting of the extreme value and on the fill level change;
   transmitting the radar-based measurement signal toward the medium using the signal production unit;
   receiving the echo signal via the antenna or probe, the echo signal produced by reflection of the transmitted signal;
   generating the measurement curve based at least on the echo signal; and
   determining the fill level based on the extent to which a maximum of the measurement curve exceeds a predefined reference curve using the evaluating unit, wherein an offset and/or a function type of the reference curve is set as a function of the measured dielectric constant.

* * * * *